A. C. IONIDES, Jr.
APPARATUS FOR HEATING WATER AND OTHER LIQUIDS.
APPLICATION FILED NOV. 9, 1914.
1,239,398.
Patented Sept. 4, 1917.
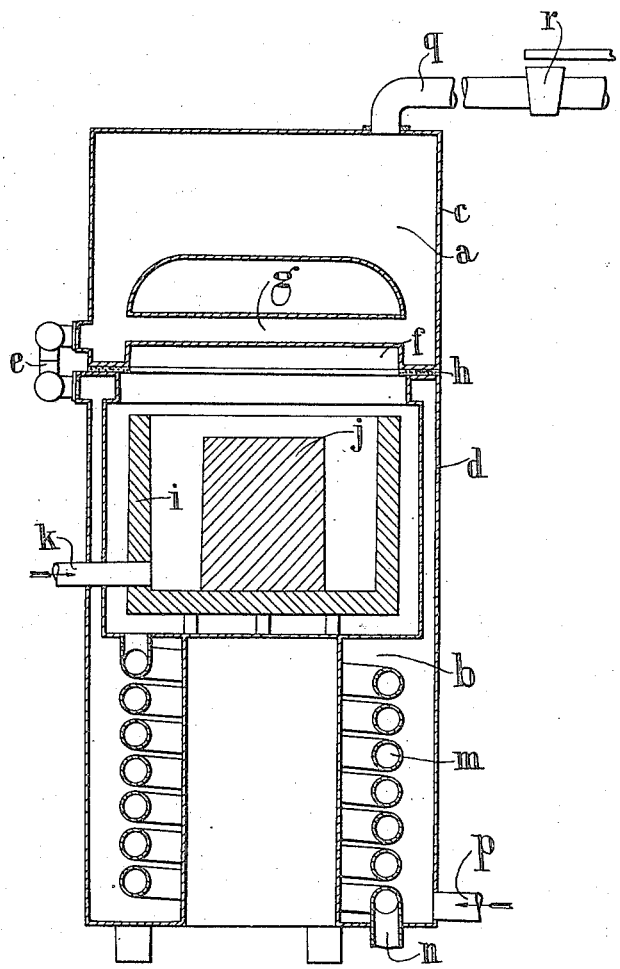
WITNESSES
INVENTOR
Alexander Constantine Ionides
BY
Mason Fenwick + Lawrence
ATTORNEYS

UNITED STATES PATENT OFFICE.

ALEXANDER CONSTANTINE IONIDES, JR., OF LONDON, ENGLAND.

APPARATUS FOR HEATING WATER AND OTHER LIQUIDS.

1,239,398.     Specification of Letters Patent.     Patented Sept. 4, 1917.

Application filed November 9, 1914. Serial No. 871,183.

*To all whom it may concern:*

Be it known that I, ALEXANDER CONSTANTINE IONIDES, Jr., a subject of the King of Great Britain and Ireland, and residing at 34 Porchester Terrace, London, W., England, have invented certain new and useful Improved Apparatus for Heating Water and other Liquids, of which the following is a specification.

This invention relates to apparatus for heating water and other liquids, its object being to provide an apparatus of increased heating efficiency.

The invention consists in a liquid heating apparatus in which a combustible mixture in practically self burning proportions admitted at a low pressure to a combustion chamber produces products of combustion which leave the apparatus from the lowest part thereof without the use of suction produced by an exhauster, chimney or the like and in which the combustion chamber is preferably formed within a wall of refractory material containing or surrounded by a jacket, coil or the like through which the liquid to be heated is circulated.

The invention also consists in the improved apparatus for heating water and other liquids, as hereinafter described.

One method of carrying the invention into effect is illustrated diagrammatically in the accompanying drawing, as applied by way of example to a heater for producing a continuous supply of hot water. The casing of the heater forms a cylindrical water jacket having two water spaces $a$ and $b$, which are connected by an external pipe $c$ constructed as a swivel joint permitting lateral movement of the upper casing part $c$, relatively to the lower part $d$, in order that access may be gained to a chamber $f$ surrounded by the water spaces. The upper casing part is arched internally, as shown, and is usually provided with one or more circulating tubes $g$ within the space $f$. A suitable jointing $h$ is inserted between the two casing parts $c$ and $d$, or if preferred, the joint made in a plane slightly inclined to the horizontal, in order to render the joint sufficiently gas-tight when the apparatus is closed.

The water space $b$ within the lower part $d$ of the casing is annular, and considerably contracted where it surrounds the space $f$, in order to accommodate a cylindrical shell $i$ of firebrick or other refractory material. This shell is open at its upper end, and contains a central core $j$ of the same material, the annular space thus formed between the shell $i$ and core $j$ serving as a combustion chamber, to which a combustible mixture is admitted through a tangentially arranged tube $k$ usually made of plumbago. The lower part of the water space $b$ contains a tubular coil $m$, connected to the space $f$ below the combustion chamber, and terminating in an outlet pipe $n$ passing through the bottom of the lower casing $d$. Water is admitted to the water space $b$ through an inlet $p$, and leaves the upper water space $a$ by an outlet, $q$, usually provided with a suitable stop cock $r$.

When in use, the apparatus is heated by the combustion of a gaseous mixture of coal gas and air or other appropriate gaseous mixture, which is maintained in as near as possible the correct proportions for complete combustion, by any suitable regulating apparatus, and before being admitted to the inlet tube $k$, leading to the combustion chamber, it is preferably passed through a device which will prevent the backward propagation of flame in the event of a back-firing taking place, the device usually employed being of the type in which the combustible gas is admitted into the current of air through perforations distributed along the length of a septum separating the gas and air conduits. In order to effect ignition of the mixture in the combustion chamber, the upper part of the casing is swung laterally about the swivel joint $c$, and the mixture having been ignited, the upper part $c$ of the casing is replaced in its normal position, in which the space $f$ is entirely closed. Water is then admitted to the heater by the inlet $p$, and the stop cock $r$ opened. Under these conditions, combustion is effected in the annular space between the shell $i$ and core $j$, the products of combustion passing upward to heat the water in the upper water space $a$, and thereafter downward through the annular passage between the shell $i$ and the surrounding water jacket, whereby the water in the latter is also heated in passing upward. The products then enter the tubular coil $m$, and in passing downward, are cooled by preheating the water which enters the water space $b$ by the inlet $p$. In this way, combustion of the gaseous mixture is effected in a chamber practically surrounded by the water to be heated, and as the resulting products of combustion are considerably cooled in preheating the incoming water, greater advantage is taken of the heat produced by combustion than in heating apparatus in which the products are withdrawn by suction produced by a fan or chimney.

The wall of refractory material also plays an important part in increasing the efficiency of the apparatus since it prevents such temperature reductions as might render impossible complete combustion of the mixture, maintains a steady temperature within the combustion chamber and has a reverberatory effect in radiating heat to the surrounding jacket through which the liquid is passed.

Having now described my invention what I claim as new and desire to secure by Letters Patent is:—

1. In combination in apparatus for heating liquid by combustion of a mixture of gases proportioned to avoid substantial residue of a constituent of combustion, a liquid jacketed combustion chamber, an inlet for admitting said mixture thereto, means for maintaining in the neighborhood of said inlet the intensely hot zone necessary for continued combustion of said mixture, means for maintaining a zone of lower temperature between said intensely hot zone and the chamber walls and means for leading the combustion products from said lower temperature zone downward by a tortuous path through the liquid passing to the chamber walls so that said products, after cooling to a maximum extent, will escape into the atmosphere at a lower level than said chamber and without throwing a back pressure thereon.

2. Apparatus for heating liquid by high temperature gaseous combustion, comprising in combination a liquid containing jacket inclosing a space, a cylindrical vessel of refractory material placed concentrically within said space, said vessel being open only at the top to communicate with an annular passage between its wall and said jacket, means for admitting to said chamber a low pressure combustible gaseous mixture proportioned so that without the addition of any further air combustion results solely in the generation of products of combustion with the corresponding very high temperature in said vessel and a long conduit surrounded by the liquid containing jacket extending downwardly from said annular passage and opening into the atmosphere at a point below the combustion chamber to discharge said products when fully cooled with a minimum of pressure throughout the system.

In testimony whereof I have signed my name to this specification in the presence of two subscribing witnesses.

ALEXANDER CONSTANTINE IONIDES, (Junior.)

Witnesses:
P. A. OUTHWAITE,
I. J. WORTH.

Copies of this patent may be obtained for five cents each, by addressing the "Commissioner of Patents, Washington, D. C."